United States Patent
Pettibone

(10) Patent No.: US 9,747,670 B2
(45) Date of Patent: Aug. 29, 2017

(54) METHOD AND SYSTEM FOR IMPROVING WAFER SURFACE INSPECTION SENSITIVITY

(71) Applicant: KLA-Tencor Corporation, Milpitas, CA (US)

(72) Inventor: Donald Pettibone, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 36 days.

(21) Appl. No.: 14/313,748

(22) Filed: Jun. 24, 2014

(65) Prior Publication Data

US 2015/0003721 A1 Jan. 1, 2015

Related U.S. Application Data

(60) Provisional application No. 61/839,497, filed on Jun. 26, 2013.

(51) Int. Cl.
*G06K 9/62* (2006.01)
*G06T 5/00* (2006.01)
*G06T 7/00* (2017.01)
*G06T 5/50* (2006.01)

(52) U.S. Cl.
CPC ............. *G06T 5/002* (2013.01); *G06T 5/50* (2013.01); *G06T 7/001* (2013.01); *G06T 2207/30148* (2013.01)

(58) Field of Classification Search
CPC ........ G06T 7/0002–7/001; G06T 2207/30148; G06T 2207/20182; G06K 9/40
See application file for complete search history.

(56) References Cited

U.S. PATENT DOCUMENTS

| | | | |
|---|---|---|---|
| 5,422,724 A | 6/1995 | Kinney et al. | |
| 5,870,187 A | 2/1999 | Uritsky et al. | |
| 6,882,416 B1 | 4/2005 | Hunter et al. | |
| 7,227,628 B1 | 6/2007 | Sullivan et al. | |
| 7,362,448 B1 | 4/2008 | Liu et al. | |
| 7,463,352 B2 | 12/2008 | Karpol et al. | |
| 7,630,069 B2 | 12/2009 | Naftali et al. | |
| 8,223,327 B2 | 7/2012 | Chen et al. | |
| 2003/0048957 A1* | 3/2003 | Dai et al. | 382/260 |

(Continued)

FOREIGN PATENT DOCUMENTS

JP 2000180377 A 6/2000

OTHER PUBLICATIONS

C. A. Glasbey, "An analysis of histogram-based thresholding algorithms," Comput. Vis. Graph. Image Process., vol. 55, No. 6, pp. 532-537, Nov. 1993.

(Continued)

*Primary Examiner* — Brian P Werner
(74) *Attorney, Agent, or Firm* — Suiter Swantz pc llo

(57) ABSTRACT

Improvement of wafer surface inspection sensitivity includes acquiring a first inspection image from the surface of the wafer, generating a reference image by applying a thresholding function to the first image in order to isolate a speckle signal component of the first image induced by wafer surface roughness, acquiring one or more measurement inspection images from the surface of the wafer, and generating a difference image by subtracting the generated one or more reference images from the acquired one or more measurement inspection images.

22 Claims, 5 Drawing Sheets

(56) References Cited

U.S. PATENT DOCUMENTS

| | | |
|---|---|---|
| 2006/0067571 A1 | 3/2006 | Onishi |
| 2006/0109903 A1* | 5/2006 | Bergen et al. ............ 375/240.12 |
| 2009/0161980 A1* | 6/2009 | Wang et al. .................. 382/264 |
| 2010/0061620 A1* | 3/2010 | Doe et al. ..................... 382/145 |
| 2011/0169944 A1 | 7/2011 | Zhao et al. |
| 2012/0044486 A1* | 2/2012 | Chen et al. ................ 356/237.5 |
| 2012/0268735 A1 | 10/2012 | Chen et al. |
| 2012/0327415 A1* | 12/2012 | Ito ................................ 356/369 |

OTHER PUBLICATIONS

P. K. Sahoo et al., "A survey of thresholding techniques," Comput. Vis. Graph. Image Process., vol. 41, Issue 2, pp. 233-260, Feb. 1988.

Fathi, A. et al., "Efficient Image Denoising Method Based on a New Adaptive Wavelet Packet Thresholding Function," IEEE Transactions on Image Processing, vol. 21, No. 9, pp. 3981-3990, Sep. 2012.

Thresholding (image processing), Wikipedia, https://en.wikipedia.org/wiki/Thresholding_(image_processing) #Shapiro2001, 2 pages, Printed online Oct. 19, 2015.

Speckle pattern, Wikipedia, https://en.wikipedia.org/wiki/Speckle_pattern, 4 pages, Printed online.

Encyclopedia of Laser Physics and Technology, Speckle, RP Photonics Encyclopedia, https://www.rp-photonics.com/speckle.html, 1 page.

J.W. Goodman, "Some Fundamental Properties of Speckle," Journal of the OSA, vol. 66, Issue 11, pp. 1145-1150, Nov. 1976, https://www.osapublishing.org/josa/abstract.cfm?uri=josa-66-11-1145.

* cited by examiner

METHOD AND SYSTEM FOR IMPROVING WAFER SURFACE INSPECTION SENSITIVITY

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). Each of the listed applications is also incorporated herein by reference in the entirety.

RELATED APPLICATIONS

For purposes of the USPTO extra-statutory requirements, the present application constitutes a regular (non-provisional) patent application of United States Provisional Patent Application entitled REPEAT INSPECTION SENSITIVITY THROUGHOUT SPECKLE SUBSTRACTION, naming Don Pettibone as inventor, filed Jun. 26, 2013 Application Ser. No. 61/839,497.

TECHNICAL FIELD

The present invention generally relates to the inspection of a surface of a semiconductor wafer, and, in particular, to the improvement of darkfield wafer inspection sensitivity.

BACKGROUND

As the demand for integrated circuits having ever-smaller device features continues to increase, the need for improved substrate inspection systems continues to grow. One aspect of inspection tool operation includes monitoring wafers before and after they enter a fabrication process device in order to determine whether the given device is adding particles, or 'adders,' to the wafers. A fundamental limit on sensitivity of wafer surface scanning techniques is the signal associated with wafer surface roughness. The presence of wafer surface roughness limits the level of sensitivity achievable by a given wafer surface inspection system. Therefore, it would be desirable to provide a system and method for curing defects such as those of the identified above.

SUMMARY

A method for improving wafer surface inspection is disclosed, in accordance with one illustrative embodiment of the present disclosure. In one illustrative embodiment, the method includes acquiring one or more first inspection images from the surface of the wafer. In another illustrative embodiment, the method includes generating one or more reference images by applying a thresholding function to the one or more first inspection images in order to at least partially isolate a speckle signal component of the one or more first inspection images, the speckle signal component being at least partially induced by roughness of the wafer surface. In another illustrative embodiment, the method includes acquiring one or more measurement inspection images from the surface of the wafer. In another illustrative embodiment, the method includes generating one or more difference images by subtracting the generated one or more reference images from the acquired one or more measurement inspection images, the generated difference image having a reduced level of wafer roughness induced speckle relative to the one or more first inspection images.

A method for improving wafer surface inspection is disclosed, in accordance with one illustrative embodiment of the present disclosure. In one illustrative embodiment, the method includes acquiring one or more first inspection images from the surface of a wafer prior to loading the wafer into a fabrication process device. In another illustrative embodiment, the method includes generating one or more reference images by applying a thresholding function to the one or more first inspection images in order to at least partially isolate a speckle signal component of the one or more first inspection images. In another illustrative embodiment, the speckle signal component is at least partially induced by roughness of the wafer surface. In another illustrative embodiment, the method includes acquiring one or more measurement inspection images from the surface of the wafer after unloading the wafer from a fabrication process device. In another illustrative embodiment, the method includes generating one or more difference images by subtracting the generated one or more reference images from the acquired one or more measurement inspection images in order to identify defects added to the surface of the wafer by the fabrication process device.

A system for improving wafer surface inspection is disclosed, in accordance with one illustrative embodiment of the present disclosure. In one illustrative embodiment, the system includes an inspection sub-system for acquiring one or more first inspection images from a surface of a wafer and one or more measurement inspection images from the surface of the wafer. In one illustrative embodiment, the inspection sub-system includes one or more illumination sources configured to direct illumination onto a selected portion of the surface of the wafer, and one or more detectors configured to detect one or more features of the surface of the wafer. In one illustrative embodiment, the system includes a controller communicatively coupled to the one or more detectors. In one illustrative embodiment, the controller includes one or more processors configured to execute program instructions configured to cause the one or more processors to: receive one or more first inspection images from the one or more detectors; generate one or more reference images by applying a thresholding function to the one or more first inspection images in order to at least partially isolate a speckle signal component of the one or more first inspection images, the speckle signal component being at least partially induced by roughness of the wafer surface; receive one or more measurement inspection images from the one or more detectors; and generate one or more difference images by subtracting the generated one or more reference images from the received one or more measurement inspection images, the generated difference image having a reduced level of wafer roughness induced speckle relative to the one or more first inspection images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1 through 4B, a system 100 and method 200 for improving wafer surface inspection sensitivity are described in accordance with the present disclosure.

A fundamental limit on the sensitivity of wafer surface inspection tools, or any darkfield tool, is the optical signal associated with the surface roughness of the inspected wafer. In the case of a single inspection, wafer surface roughness behaves like noise due to the associated spatial randomness of the roughness. However, the signal associated with wafer surface roughness is generally steady-state in time. As such, the signal associated with wafer surface roughness is not a noise source in a strict sense.

Embodiments of the present disclosure make use of the steady-state (albeit spatially random) nature of the wafer surface roughness in settings where a single wafer is scanned multiple times. Embodiments of the present disclosure serve to isolate a wafer roughness induced speckle component of a wafer inspection image and store the isolated component in the form of a reference image. Embodiments of the present disclosure further serve to apply the reference image to subsequent measurement inspection images by forming a difference image, which is formed by subtracting the wafer roughness induced speckle out of subsequent measurement images. The subtraction will "clean up" the resulting difference image and allow the present invention to establish lower thresholds (i.e., lower threshold than used prior to reference image of present disclosure), which may provide for the reliable detection of smaller defects.

It is noted herein that the subtraction of one signal from another may lead to an increase (e.g., $\sqrt{2}$ increase) in the temporally random component of the images. Additional embodiments of the present disclosure serve to mitigate this effect through the acquisition and averaging of multiple images, which may further serve to reduce noise in the resulting reference image. In some embodiments of the present disclosure, a single wafer may be scanned multiple times at the outset of the inspection process (i.e., prior to reference image formation), with multiple images being averaged prior to the generation of one or more reference images. In additional embodiments of the present disclosure, two or more reference images may be averaged to form an improved averaged reference wafer. By averaging multiple reference images of the same wafer, a reduction in the temporally random noise component of approximately $1/\sqrt{N}$ may be achieved, where N represents the number of averaged reference images.

Additional embodiments of the present disclosure may serve to register and/or interpolate a reference image with an acquired measurement image prior to generating the associated difference image.

Figure 1:
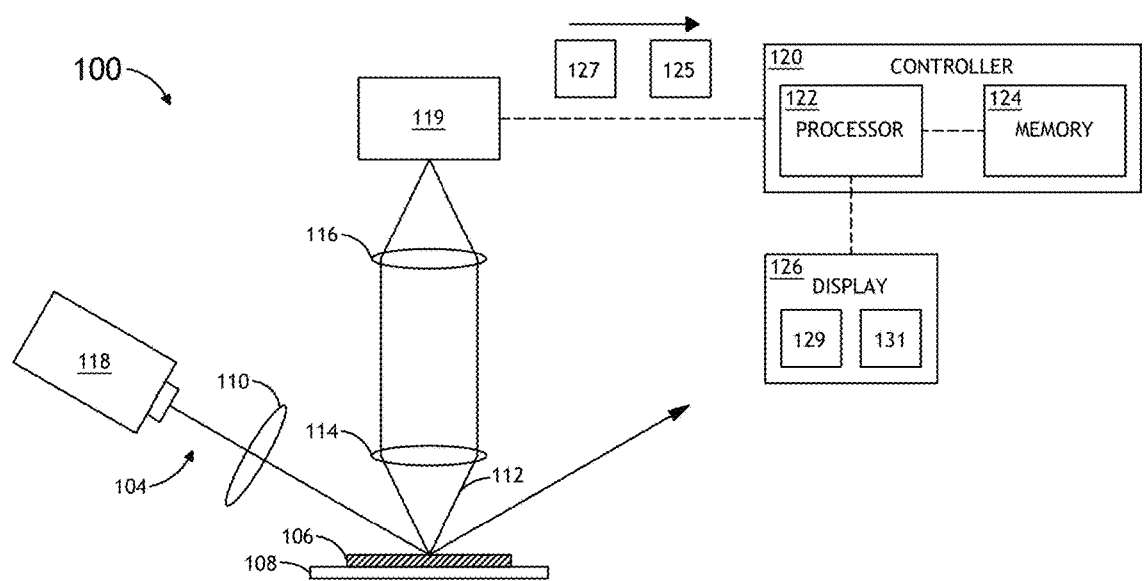
FIG. 1 is a block diagram view of a system for improving wafer surface inspection sensitivity, in accordance with one embodiment of the present invention.

FIG. 1 illustrates a conceptual block diagram view of a system 100 for improved wafer surface inspection sensitivity, in accordance with one or more embodiments of the present disclosure.

It is noted herein that system 100 is particularly useful in settings where multiple inspection images are obtained from a single wafer. In one embodiment, the system 100 may be implemented in order to detect new defects, or 'adders,' on the surface of a semiconductor wafer. For example, new defects may be inadvertently added to the surface of the semiconductor wafer during transfer in and out of one or more fabrication processing units. The system 100 may be used to detect the new defects on a wafer surface as the wafer is loaded in and unloaded out of a fabrication unit multiple times. As described further herein, the system 100 may generate a reference image based on an initial inspection scan of a wafer. The reference image allows the system 100 to 'subtract out' repeating (or near repeating) wafer roughness induced speckle during a subsequent measurement inspection scan, reducing the size of the smallest detectable defect during the subsequent measurement inspection scan.

In one embodiment, the system 100 includes an inspection sub-system 102. The inspection sub-system 102 is configured to perform one or more optical inspections of one or more wafers 106. For example, the inspection sub-system 102 may acquire one or more inspection images of one or more portions of the surface of the wafer 106. It is recognized herein that the inspection sub-system 102 may include any inspection sub-system 102 known in the art. In one embodiment, the inspection sub-system 102 includes a darkfield inspection sub-system, as depicted in FIG. 1. It is further recognized that the inspection sub-system 102 may include of any optical arrangement known in the art suitable for performing darkfield inspection.

In one embodiment, the inspection sub-system 102 includes one or more illumination sources 118. In one embodiment, the one or more illumination sources 118 may include any broadband light source (e.g., discharge lamp) suitable for used in a darkfield inspection process. In another embodiment, the one or more illumination sources 118 may include any narrowband light source suitable for use in a darkfield inspection process. For instance, the illumination source 118 may include one or more lasers.

In another embodiment, the inspection sub-system 102 includes one or more illumination optical elements 110. For example, as shown in FIG. 1, the inspection sub-system 102 may include, but is not limited to, one or more lenses 110 suitable for focusing light 104 from the illumination source 118 onto a selected portion of the surface of wafer 106 disposed on wafer stage 108. The inspection sub-system 102 may include any set of illumination optical elements known in the art of dark field inspection. For example, although not shown, the inspection sub-system 102 may additionally include one or more mirrors, one or more filters, one or more polarizing elements, one or more beam splitters, and the like, in order to focus, direct, and/or process light from the illumination source 118 prior to impingement onto the wafer 106.

In another embodiment, the inspection sub-system 102 includes one or more detectors 119. The one or more detectors 119 may include any detector or sensor known in the art of darkfield inspection. For example, the detector 119 of the inspection sub-system 102 may include, but is not limited to, a CCD detector, a TDI-CCD detector, a PMT device, and the like.

In another embodiment, the inspection sub-system 102 may include one or more illumination collection and/or imaging optical elements. For example, as shown in FIG. 1, the inspection sub-system 102 may include, but is not limited to, a collection lens or objective 114 suitable for collecting light 112 scattered from one or more features (e.g., defects) of the surface of wafer 106. By way of another example, as shown in FIG. 1, the inspection sub-system 102 may include, but is not limited to, one or more intermediate lenses or projection lenses 116. It is noted herein that the collection and/or imaging optical elements of the inspection sub-system 102 may include any optical elements known in the art of darkfield inspection.

It is noted herein that for purposes of simplicity the inspection sub-system 102 has been depicted in the form a simplified block diagram. This depiction, including the components and optical configuration, is not limiting and is provided for illustrative purposes only. It is recognized herein that the illumination sub-system 102 may include any number of optical elements, illumination sources, and detectors to carry out the inspection process(es) described herein.

In another embodiment, the system 100 includes a controller 120. In one embodiment, the controller 120 is communicatively coupled to the detector 119. For example, the controller 120 may be coupled to the output of the detector 119 of the inspection sub-system 102. The controller 120 may be coupled to the detector 119 in any suitable manner (e.g., by one or more transmission media indicated by the line shown in FIG. 1) such that the controller 120 can receive the output acquired by the inspection sub-system 102.

In one embodiment, the controller 120 includes one or more processors 122. In one embodiment, the one or more processors 122 are configured to execute a set of program instructions maintained in a memory medium 124, or memory.

In another embodiment, the program instructions are configured to cause the one or more processors 122 to receive at least a first inspection image 125 from the inspection sub-system 102. In another embodiment, the program instructions are configured to cause the one or more processors 122 to generate one or more reference images 129 by applying a thresholding function to the at least a first image 125 in order to at least partially isolate a speckle signal component of the at least a first image 125. In another embodiment, the program instructions are configured to cause the one or more processors 122 to receive one or more measurement inspection images 127 from the surface of the wafer 106. In another embodiment, the program instructions are configured to cause the one or more processors 122 to generate a difference image 131 by subtracting the generated one or more reference images 129 from the acquired one or more measurement inspection images 127. Additional embodiments of the controller 120 are described further herein.

The one or more processors 122 of controller 120 may include any processing element known in the art. In this sense, the one or more processors 122 may include any microprocessor-type device configured to execute software algorithms and/or instructions. In one embodiment, the one or more processors 122 may consist of a desktop computer, mainframe computer system, workstation, image computer, parallel processor, or any other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 124. Moreover, different subsystems of the system 100 (e.g., inspection sub-system 102, display, or user interface) may include processor or logic elements suitable for carrying out at least a portion of the steps described throughout the present disclosure. Therefore, the above description should not be interpreted as a limitation on the present invention but merely an illustration.

The memory medium 124 may include any storage medium known in the art suitable for storing program instructions executable by the associated one or more processors 122. For example, the memory medium 124 may include a non-transitory memory medium. For instance, the memory medium 124 may include, but is not limited to, a read-only memory, a random access memory, a magnetic or optical memory device (e.g., disk), a magnetic tape, a solid state drive and the like. In another embodiment, it is noted herein that the memory 124 is configured to store one or more results from the inspection sub-system 102 and/or the output of one or more of the various steps described herein. It is further noted that memory 124 may be housed in a common controller housing with the one or more processors 122. In an alternative embodiment, the memory 124 may be located remotely with respect to the physical location of the one or more processors 122 and controller 120. For instance, the one or more processors 122 of controller 120 may access a remote memory (e.g., server), accessible through a network (e.g., internet, intranet and the like).

In another embodiment, the controller 120 of the system 100 may be configured to receive and/or acquire data or information from other systems (e.g., inspection results from an inspection system or metrology results from a metrology system) by a transmission medium that may include wireline and/or wireless portions. In this manner, the transmission medium may serve as a data link between the controller 120 and other sub-systems of the system 100. Moreover, the controller 120 may send data to external systems via a transmission medium (e.g., network connection).

In another embodiment, the system 100 includes a user interface (not shown). In one embodiment, the user interface is communicatively coupled to the one or more processors 122 of controller 120. In another embodiment, the user interface device may be utilized by controller 120 to accept selections and/or instructions from a user. In some embodiments, described further herein, a display 126 may be used to display data to a user. In turn, a user may input selection and/or instructions responsive to data displayed (e.g., inspection images) to the user via the display device 126.

The user interface device may include any user interface known in the art. For example, the user interface may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel mounted input device, or the like. In the case of a touchscreen interface device, those skilled in the art should recognize that a large number of touchscreen interface devices may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention.

The display device 126 may include any display device known in the art. In one embodiment, the display device may include, but is not limited to, a liquid crystal display (LCD). In another embodiment, the display device may include, but is not limited to, an organic light-emitting diode (OLED) based display. In another embodiment, the display device may include, but is not limited to, a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user interface device (e.g., touchscreen, bezel mounted interface, keyboard, mouse, trackpad, and the like) is suitable for implementation in the present invention.

The embodiments of the system 100 illustrated in FIG. 1 may be further configured as described herein. In addition, the system 100 may be configured to perform any other step(s) of any of the method embodiment(s) described herein.

Figure 2:
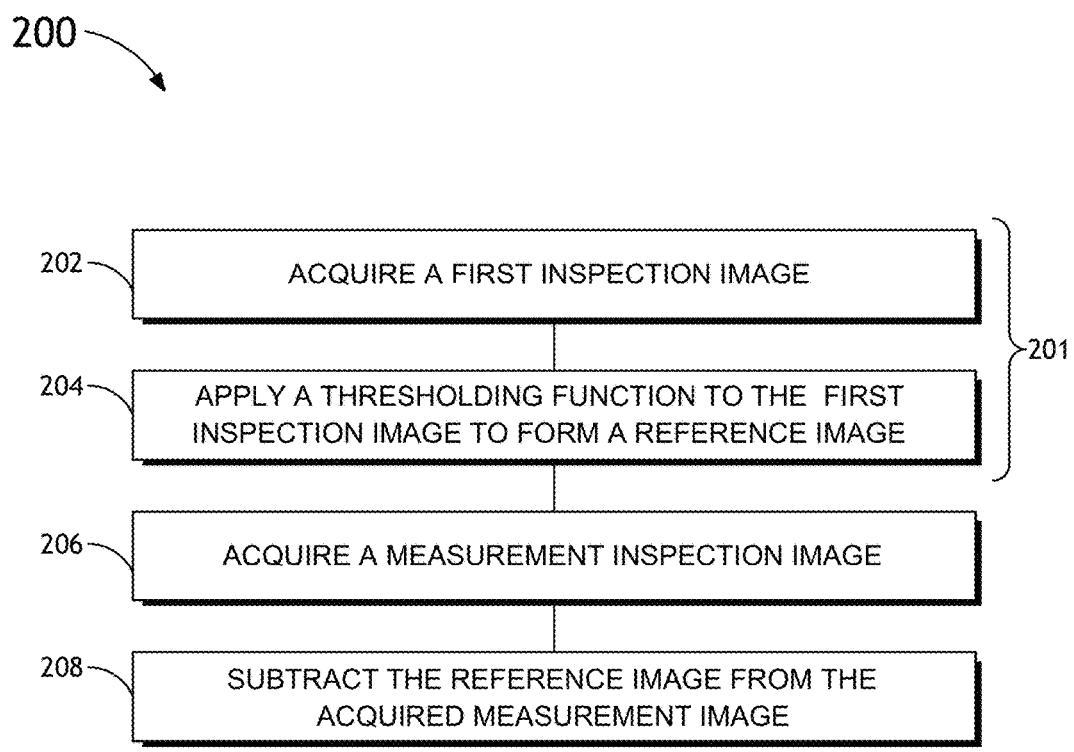
FIG. 2 is a process flow diagram illustrating a method for improving wafer surface inspection sensitivity, in accordance with one embodiment of the present invention.

FIG. 2 is a flow diagram illustrating steps performed in a method 200 for improving wafer surface inspection sensitivity, in accordance with one or more embodiments of the present invention. It is noted herein that the steps of method 200 may be implemented all or in part by the system 100. It is further recognized, however, that the method 200 is not limited to the system 100 in that additional or alternative system-level embodiments may carry out all or part of the steps of method 200.

The method 200 includes generating 201 one or more reference images of a surface of the wafer 106. In one embodiment, the one or more generated reference images consist of an at least partially isolated speckle signal component. The speckle signal component may be at least partially induced by surface roughness of the wafer 106.

In one embodiment, as previously noted herein, the generated reference image is based on an initial inspection scan (or scans) of a wafer 106. Further, the reference image serves to 'subtract out' repeating (or near repeating) wafer roughness induced speckle during a subsequent measurement inspection scan, thereby reducing the size of the smallest detectable defect during the subsequent measurement inspection scan. The generation of one or more reference images is described in greater detail in the following description of steps 202-204.

In step 202, a first inspection image 125 is acquired. For example, as shown in FIG. 1, the one or more processors 122 acquire a first inspection image 125. For instance, inspection sub-system 102 scans a portion of the wafer 106 so as to form a first inspection image of the wafer 106. Then, the inspection sub-system 102 transmits the imagery data of the first inspection image 125 to the one or more processors 122. In one embodiment, the first inspection image 125 may consist of a first 'test' image of a portion of wafer 106. In another embodiment, the first inspection image 125 may consist of a first 'measurement' image of a portion of wafer 106.

In another embodiment, the first image 125 may be stored in memory 124 (or a remote memory) for future retrieval and use. In another embodiment, the first image 125 may be displayed to a user via display 126 (or a remote display).

In one embodiment, multiple inspection images may be acquired and averaged prior to application of the following analysis steps. For example, two or more first inspection images (i.e., images prior to reference image formation) may be received by the one or more processors 122 from detector 119. Then, the one or more processors 122 may average the two or more images on a pixel-by-pixel basis, forming a single aggregate 'first image,' which may be processed by the following steps. In this regard, the sensitivity of wafer inspection achieved via method 200 may be improved as additional inspection measurements of the wafer 106 are acquired.

In step 204, a thresholding function is applied to the first image 125 acquired by the inspection sub-system 102. In one embodiment, the one or more processors 122 may generate the one or more reference images 129 by applying a thresholding function to one or more inspection images, one or more combined inspection images, or one or more averaged inspection images received from the detector 119. In one embodiment, the thresholding function may serve to isolate (all or in-part) the wafer roughness induced speckle signal of the first image 125 from one or more other imagery components of the first image 125. For example, the thresholding function may serve to isolate (all or in-part) the wafer roughness induced speckle signal of the first image 125 from one or more random noise components of the image 125.

It is recognized herein that speckle from an image dominated by wafer surface roughness may follow an exponential distribution, resulting in a low number of high intensity pixels. It is further recognized herein that due to the generally exponential distribution associated with wafer roughness induced speckle a thresholding operation may adequately separate the speckle signal contained within the first image 125 from the random noise component contained within the first image 125.

The one or more reference images produced by the thresholding function are 'sparse' due to the large number of zero-value pixels contained therein. It is further noted herein that, due to the low number of high intensity pixels, not all raw data from a given inspection image must be retained. In one embodiment, following application of the thresholding function in step 204, the one or more reference images 129 may be compressed. It is noted herein that any data compression routine known in the art of image processing maybe implemented in the present invention. It is noted herein that a data compression ratio between 50× to 5000× may be achieved.

In another embodiment, the controller 120 may store the reference image in memory 124 (or remote memory) for subsequent retrieval and use. In this regard, the controller 120 may retain a component of an inspection signal associated with wafer roughness induced speckle. In another embodiment, the one or more reference images 129 may be displayed to a user via display 126 (or a remote display)

In step, 206, one or more measurement images are acquired. For example, as shown in FIG. 1, the one or more processors 122 acquire a measurement inspection image 127. For instance, inspection sub-system 102 scans the same portion (at least in-part) of the wafer 106 as scanned in step 202 so as to form a measurement inspection image 127 of the wafer 106. Then, the inspection sub-system 102 transmits the imagery data of the measurement inspection image 127 to the one or more processors 122. In another embodiment, two or more measurement inspection scans may be performed to produce an averaged measurement inspection image 127, which may then be further processed with the following steps.

In another embodiment, the measurement image 127 may be stored in memory 124 (or a remote memory) for future retrieval and use. In another embodiment, the measurement image 127 may be displayed to a user via display 126 (or a remote display).

Figures 3A, 3B, 3C:
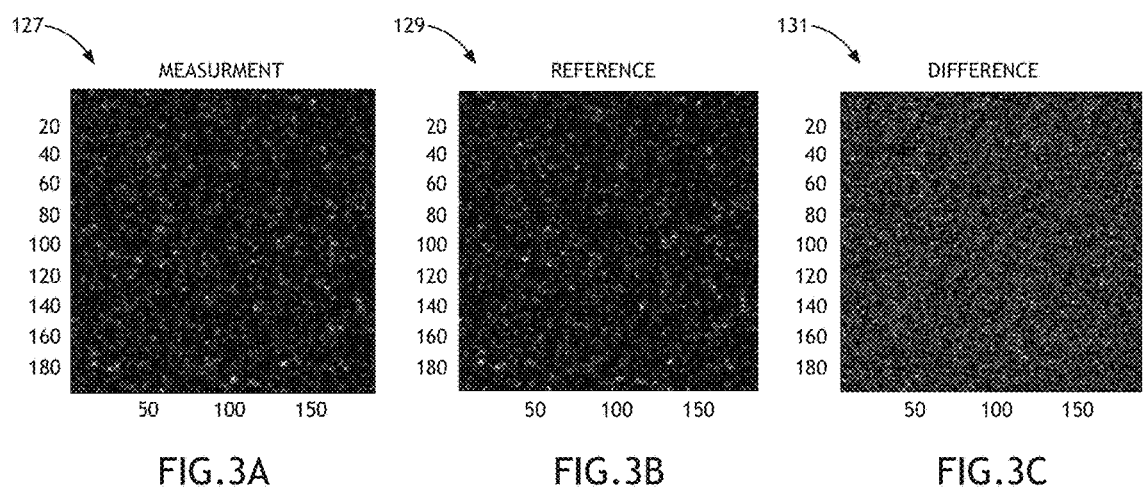
FIG. 3A is a graphical view of an unprocessed measurement wafer, in accordance with one embodiment of the present invention.
FIG. 3B is a graphical view of a generated reference image, in accordance with one embodiment of the present invention.
FIG. 3C is a graphical view of a generated difference image, in accordance with one embodiment of the present invention.

In step 208, a difference image is formed. In one embodiment, a difference image 131 is generated by subtracting the generated one or more reference images 129 (e.g., non-averaged or averaged) from the acquired one or more measurement inspection images 127 (e.g., non-averaged or averaged). For example, the one or more processors 122 may form a differential inspection image by subtracting the one or more reference images 129 from the one or more measurement inspection image 127 on a pixel-by-pixel basis. FIGS. 3A-3C illustrate a graphical view of the formation of the difference image 131. FIG. 3A depicts an unprocessed measurement image 127 acquired via inspection sub-system 102. FIG. 3B depicts a reference image 129 (e.g., non-averaged or averaged) formed via application of a thresholding function. FIG. 3C depicts a difference image 131 displaying the removal of the common wafer roughness induced speckle as observed in FIGS. 3B and 3C. As previously noted, since the wafer roughness induced speckle signal is generally non-random in time, the subtraction of the reference image 129 from the measurement image 127 serves to significantly reduce the component of the inspection signal associated with wafer roughness induced speckle.

In another embodiment, an additional thresholding function may be applied to the difference image 131 to eliminate one or more sources of noise. It is noted herein that, due to removal of at least a portion of the speckle signal, the thresholding function required for the difference image 131 may be significantly smaller than needed on an unprocessed image (e.g., measurement image 127). As such, defects of significantly smaller signal may become detectable. By way of example, in cases where a threshold applied to a difference image 131 may be dropped relative to an unprocessed measurement image (e.g., measurement image 127) by a factor of N, the size of detectable defects may be reduced by a factor of $N^{(1/6)}$. This is due to the $x^6$ nature of Rayleigh scattering. By way of example, in cases where a threshold of a difference image may be dropped relative to an initial measurement image by a factor of 3, the size of detectable defects may be reduced by a factor of $3^{(1/6)}=1.20$, which represents a 20% improvement in the smallest detectable defect size.

In another embodiment, prior to forming the difference image of step 208, the one or more reference images 129 may be registered and/or interpolated relative to the one or more measurement images 127. It is noted herein that prior to forming the difference image 131 the image data associated with the one or more reference images 129 and the one or more measurement image 127 may need to be registered, or 'matched.' For example, prior to forming the difference image 131, the one or more processors 122 of controller 120 may carry out a pattern matching routine one all or a portion of the imagery data of the one or more reference images 129 and the one or more measurement images 127, thereby spatially matching the associated pixel data by shifting one or more portions of the one or more reference images 129 and/or one or more measurement images 127. It is further noted that in some cases portions of the one or more reference images 129 may require interpolation based on the image data of the one or more measurement data 127. For example, prior to forming the difference image 131, the one or more processors 122 of controller 120 may carry out an interpolation routine one all or a portion of the imagery data of the one or more reference images 129 and the one or more measurement images 127, thereby spatially matching the associated pixel data by interpolating 'missing' or distorted pixel data from either the one or more reference images 129 or the one or more measurement images 127. It is noted herein that any pattern matching and/or interpolation routine known in the art of image registration or matching is suitable for implementation in the present invention.

In one embodiment, two or more reference images 129 may be statistically aggregated prior to application to the one or more measurement images 127. In one embodiment, the one or more processors 122 may statistically aggregate two or more reference images 129 following the generation of the two or more reference images via steps 202-204. It is recognized herein that any statistical aggregation process used in the art of image aggregation or image combination may be implemented by the present invention. For example, the one or more processors 122 may average two or more reference images 129 to form a single averaged reference image. For instance, the one or more processors 122 may average (e.g., straight average, weighted average and the like) the two or more reference images 129 on a pixel-by-pixel basis. It is noted herein that the averaging of multiple reference images to form a single reference image serves to reduce the time varying random noise within the multiple reference images, but does not generally impact the temporally-static speckle signal. The residual noise may be reduced by a factor of $\sqrt{N}$ where N represents the number of reference images that are averaged when forming the differential image, resulting in even lower thresholds and improved sensitivity. By way of example, in the event that multiple reference images 129 are averaged and the temporally random component in the reference image is reduced by a factor of $\sqrt{2}$, the minimum size of detectable defects may be dropped by an additional 5%.

In another embodiment, prior to averaging the two or more reference images 129, the two or more reference images 129 may be registered and/or interpolated in a manner similar to the registration and/or interpolation described previously herein.

It is noted herein that one or more reference images 129 may be acquired from any inspection image and then applied to a subsequently acquired inspection image 127 to form a difference image 131. In this regard, the system 100 may continually generate reference images 129 that may be used to analyze the presence of newly added defects on the surface of the wafer 106. In one embodiment, one or more first inspection images 127 are required from the surface of a wafer 106 prior to loading the wafer 106 into a fabrication process device. In another embodiment, one or more reference images 129 are generated by applying a thresholding function to the one or more first inspection images 127 in order to at least partially isolate a speckle signal component of the one or more first inspection images 127. In another embodiment, one or more measurement inspection images are acquired from the surface of the wafer 106 after unloading the wafer 106 from a fabrication process device. In another embodiment, one or more difference images 131 are generated by subtracting the generated one or more reference images 129 from the acquired one or more measurement inspection images in order to identify defects added to the surface of the wafer 106 by the fabrication process device.

Figure 4A:
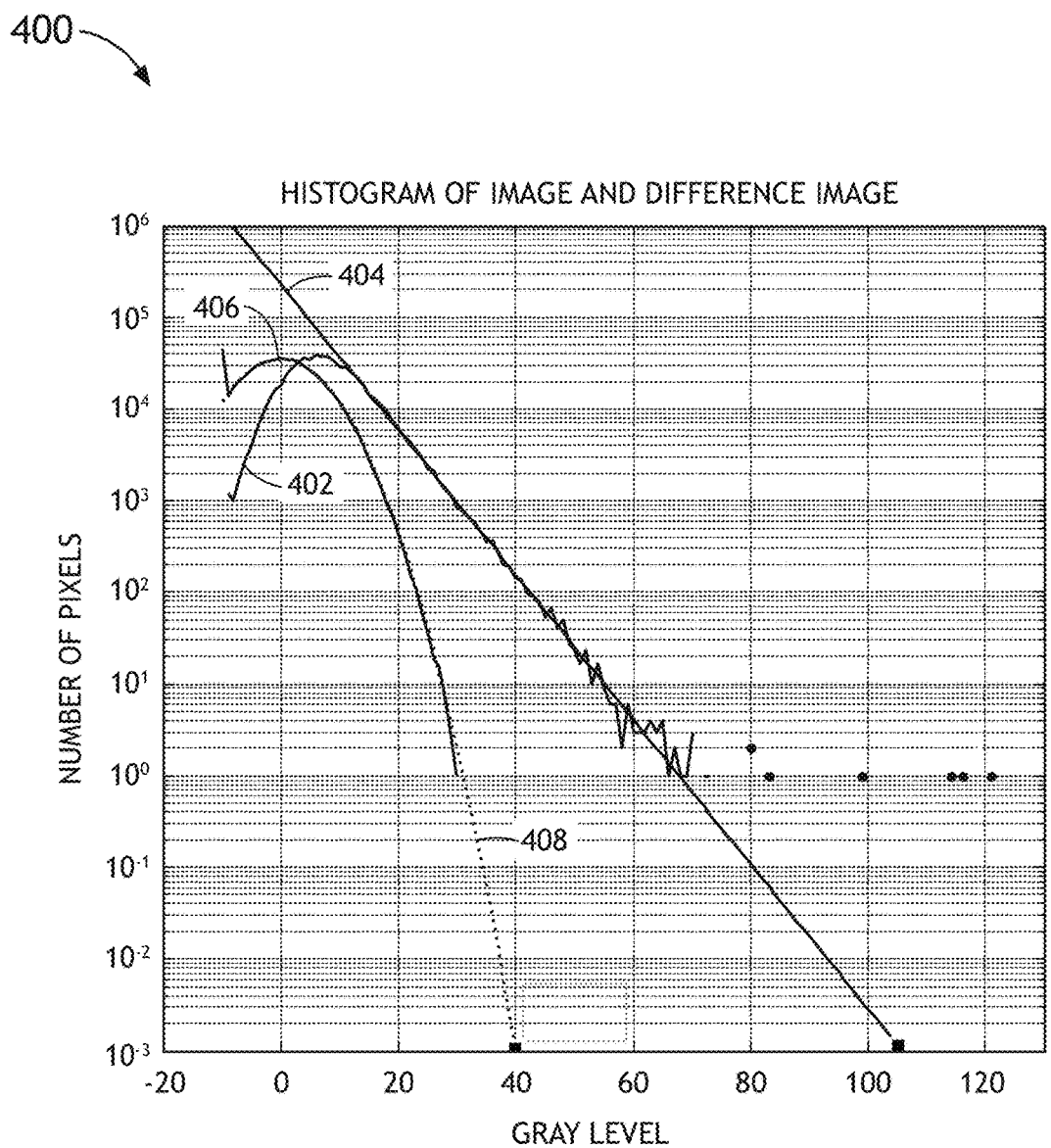
FIG. 4A is graph of histograms representing the number of pixels as a function of gray level for an unprocessed inspection image and a difference image, in accordance with one embodiment of the present invention.
Figure 4B:
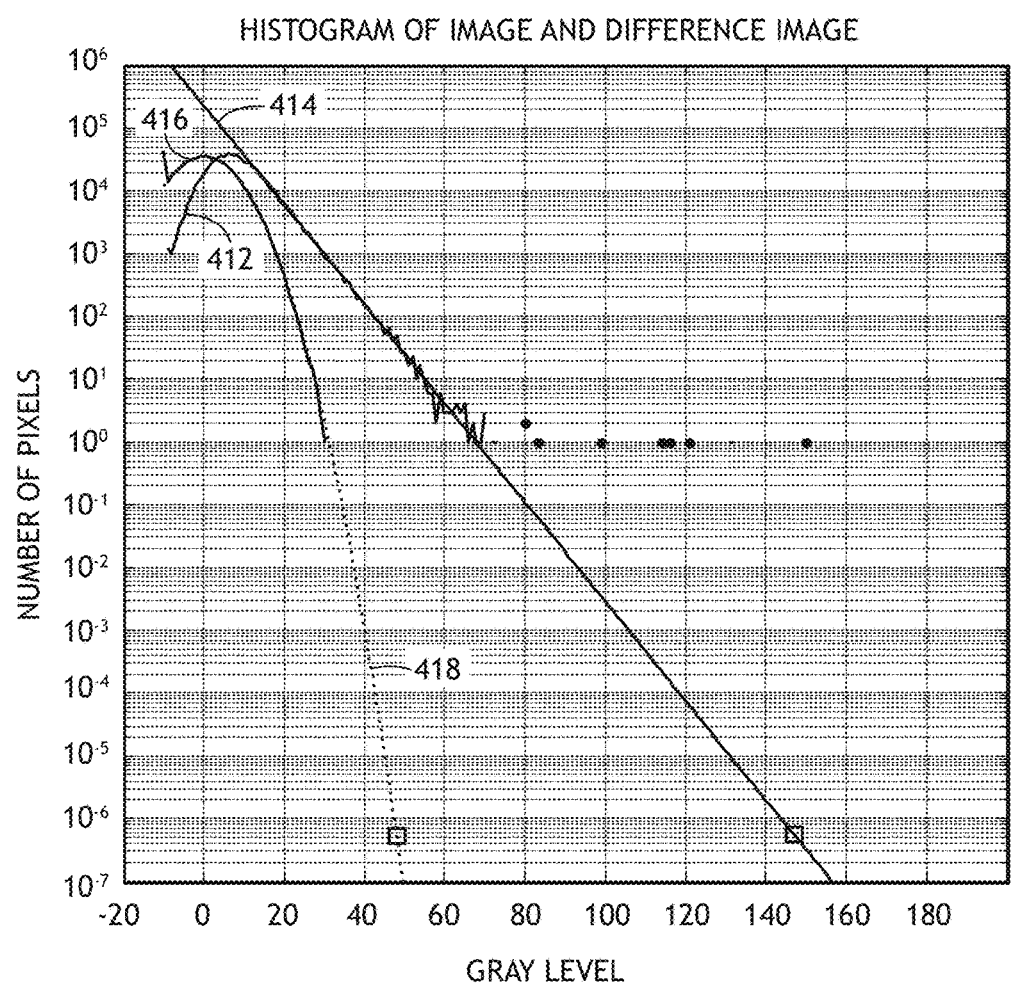
FIG. 4B is graph of histograms representing the number of pixels as a function of gray level for an unprocessed inspection image and a difference image, in accordance with one embodiment of the present invention.

FIGS. 4A and 4B illustrate graphs 400 and 410 depicting gray level distributions for unprocessed images, such as measurement image 127, and the differential image 131 and corresponding mathematical fitting functions. As shown in graph 400 of FIG. 4A, a histogram 402 representative of the number of pixels at various gray levels is shown for an unprocessed image, such as measurement image 127. Curve 404 represents a mathematical fit (e.g., exponential fit) to the histogram 402 of the unprocessed image. Further, histogram 406 represents the number of pixels as a function of gray level for a differential image 131. Curve 408 represents the mathematical fit (e.g., Gaussian fit) to the histogram 408 of the differential image 131. By way of example, the thresholding function applied in the formation of the differential image associated with FIG. 4A is selected such that a false rate is less than 1 per 1000 pixels. In this case, the achieved sensitivity may represent an improvement (relative to the unprocessed inspection image) by a factor $(105/40)^{(1/6)}=$ 1.17 (or a 15% reduction in detectable defect size). FIG. 4B represents the case where a false rate of 1 per $1 \times 10^{12}$ pixels is desired. As shown in graph 410 of FIG. 4B, a histogram 412 representative of the number of pixels as a function of gray level is shown for an unprocessed image. Curve 414 represents a mathematical fit (e.g., exponential fit) to the histogram 412 of the unprocessed image. Further, histogram 416 represents the number of pixels as a function of gray level for a differential image 131. Curve 418 represents the mathematical fit (e.g., Gaussian fit) to the histogram 418 of the differential image 131. By way of example, the thresholding function applied in the formation of the differential image associated with FIG. 4B is selected such that a false rate is less than 1 per $1 \times 10^{12}$. In this case, the achieved sensitivity may represent an improvement (relative to the unprocessed inspection image) by a factor $(147/48)^{(1/6)}=$ 1.20 (or a 17% reduction in detectable defect size). In addition, as previously noted herein, the residual noise may be reduced by a $\sqrt{N}$ where N represents the number of reference images that are averaged when forming the differential image, resulting in even lower thresholds and improved sensitivity.

In another embodiment, a user may choose to sacrifice sensitivity for a desired inspection speed. As such, a threshold level that is higher than the smallest detectable defect level may be implemented in order to enable faster inspection speed of system 100. In this regard, the controller 120 or a user (via a user interface) may direct the controller 120 to perform an inspection of wafer 106 at a selected speed. In turn, the level of matching, interpolation and/or thresholding necessary to attain the desired speed may be implemented. In this regard, the matching, interpolation and/or thresholding techniques described above may be controlled in order to reduce the level of sensitivity of system 100 so that the desired inspection speed is met.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method of improving wafer surface inspection sensitivity comprising:

acquiring one or more first inspection images from the surface of a wafer;

generating one or more reference images by applying a thresholding function to the one or more first inspection images in order to at least partially isolate a speckle signal component of the one or more first inspection images, the speckle signal component being at least partially induced by roughness of the wafer surface;

acquiring one or more measurement inspection images from the surface of the wafer; and generating one or more difference images by subtracting the generated one or more reference images from the acquired one or more measurement inspection images, the generated difference image having a reduced level of wafer roughness induced speckle relative to the one or more first inspection images.

2. The method of claim 1, further comprising:
prior to generating the one or more difference images, registering the one or more reference images and the one or more measurement inspection images in order to substantially match the patterns of the one or more reference images and the one or more measurement inspection images.

3. The method of claim 1, further comprising:
prior to generating the one or more difference images, interpolating at least one of the one or more reference images and the one or more measurement inspection images in order to substantially match the patterns of the one or more reference images and the one or more measurement inspection images.

4. The method of claim 1, further comprising:
compressing the generated one or more reference images.

5. The method of claim 1, further comprising:
storing the generated one or more reference images in memory.

6. The method of claim 1, wherein the generating one or more reference images by applying a thresholding function to the one or more first inspection images comprises:
generating a first reference image by applying a thresholding function to a first image; and
generating at least a second reference image by applying a thresholding function to at least a second image.

7. The method of claim 6, further comprising:
statistically aggregating the generated first reference image and the generated at least a second reference image.

8. The method of claim 7, wherein the statistically aggregating the generated first reference image and the generated at least a second reference image comprises:
averaging the generated first reference image and the generated at least a second reference image to form an averaged reference image.

9. The method of claim 1, further comprising:
displaying at least one of the one or more first inspection images, the one or more references images, the one or more measurement inspection images and the one or more difference images.

10. The method of claim 1, wherein acquiring at least a first inspection image from the surface of the wafer comprises:
acquiring at least a first inspection image from the surface of the wafer via a darkfield inspection process.

11. A method of improving wafer surface inspection sensitivity comprising:
acquiring one or more first inspection images from the surface of a wafer prior to loading the wafer into a fabrication process device;
generating one or more reference images by applying a thresholding function to the one or more first inspection images in order to at least partially isolate a speckle signal component of the one or more first inspection images, the speckle signal component being at least partially induced by roughness of the wafer surface;
acquiring one or more measurement inspection images from the surface of the wafer after unloading the wafer from a fabrication process device; and
generating one or more difference images by subtracting the generated one or more reference images from the acquired one or more measurement inspection images in order to identify defects added to the surface of the wafer by the fabrication process device.

12. A system for improving wafer surface inspection sensitivity comprising:
an inspection sub-system for acquiring one or more first inspection images from a surface of a wafer and one or more measurement inspection images from the surface of the wafer, the inspection sub-system including:
one or more illumination sources configured to direct illumination onto a selected portion of the surface of the wafer; and
one or more detectors configured to detect one or more features of the surface of the wafer;
a controller communicatively coupled to the one or more detectors, the controller including one or more processors configured to execute program instructions configured to cause the one or more processors to:
receive one or more first inspection images from the one or more detectors;
generate one or more reference images by applying a thresholding function to the one or more first inspection images in order to at least partially isolate a speckle signal component of the one or more first inspection images, the speckle signal component being at least partially induced by roughness of the wafer surface;
receive one or more measurement inspection images from the one or more detectors; and
generate one or more difference images by subtracting the generated one or more reference images from the received one or more measurement inspection images, the generated difference image having a reduced level of wafer roughness induced speckle relative to the one or more first inspection images.

13. The system of claim 12, wherein the one or more processors are further configured to:
register the one or more reference images and the one or more measurement inspection images in order to substantially match the patterns of the one or more reference images and the one or more measurement inspection images, prior to generating the one or more difference images.

14. The system of claim 12, wherein the one or more processors are further configured to:
interpolate at least one of the one or more reference images and the one or more measurement inspection images in order to substantially match the patterns of the one or more reference images and the one or more measurement inspection images, prior to generating a difference image.

15. The system of claim 12, wherein the one or more processors are further configured to:
compress the generated one or more reference images.

16. The system of claim 12, wherein the one or more processors are further configured to:
store the generated one or more reference images in memory.

17. The system of claim 12, wherein the generation of the one or more reference images by applying a thresholding function to the one or more first inspection images by the one or more processors comprises:
generating a first reference image by applying a thresholding function to a first image; and generating at least a second reference image by applying a thresholding function to at least a second image.

18. The system of claim 17, wherein the one or more processors are further configured to:
statistically aggregate the generated first reference image and the generated at least a second reference image.

19. The system of claim 18, wherein the statistical aggregation of the generated first reference image and the generated at least a second reference image comprises:
averaging the generated first reference image and the generated at least a second reference image to form an averaged reference image.

20. The system of claim 12, further comprising:
one or more display devices configured to display at least one of the one or more first inspection images, the one or more references images, the one or more measurement inspection images and the one or more difference images.

21. The system of claim 12, wherein inspection sub-system comprises:
a darkfield inspection sub-system.

22. The system of claim 12, wherein the wafer comprises:
a semiconductor wafer.

* * * * *